Aug. 5, 1958   D. W. McDONALD   2,846,489
CONTROL OF FRIEDEL-CRAFTS ALKYLATION CATALYST
BY MEASUREMENT OF ELECTRO CONDUCTIVITY
Filed Dec. 16, 1954
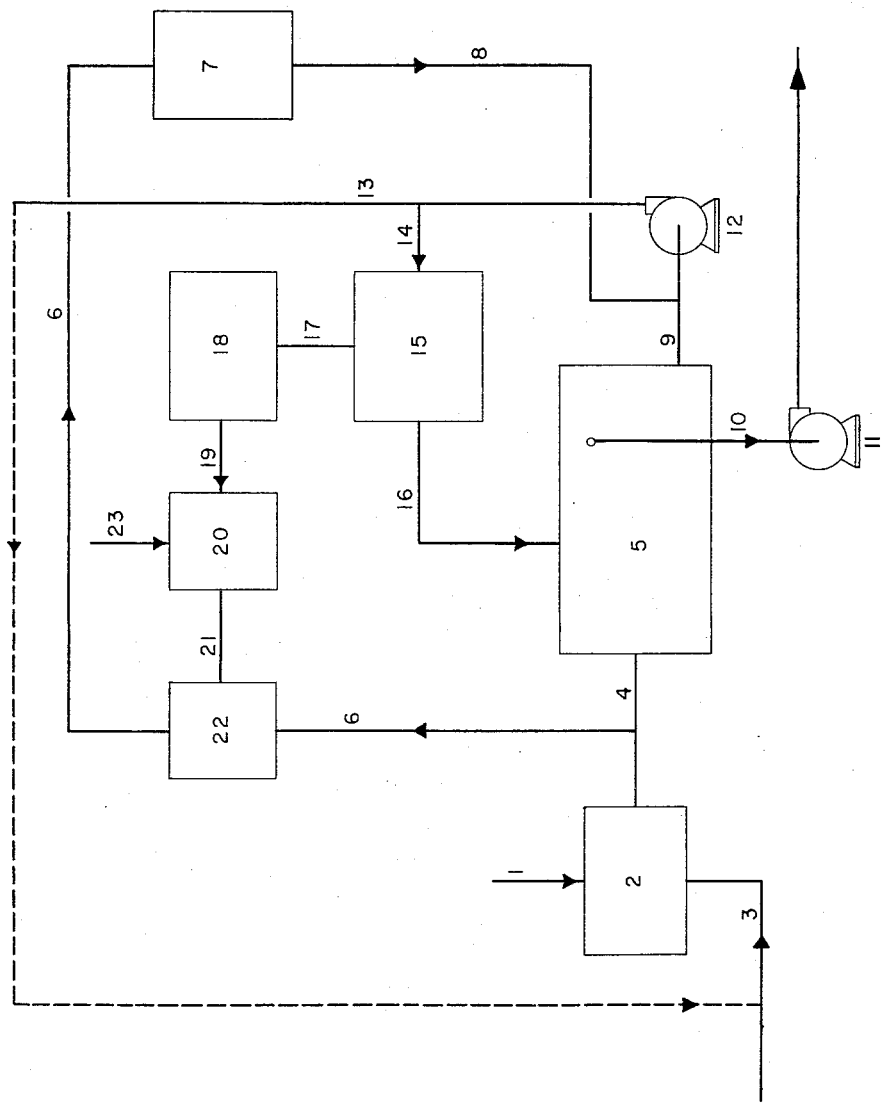
INVENTOR
David W. McDonald
BY
ATTORNEY United States Patent Office 2,846,489
Patented Aug. 5, 1958

2,846,489

CONTROL OF FRIEDEL-CRAFTS ALKYLATION CATALYST BY MEASUREMENT OF ELECTRO CONDUCTIVITY

David W. McDonald, Texas City, Tex., assignor to Monsanto Chemical Company, St. Louis, Mo., a corporation of Delaware Application December 16, 1954, Serial No. 475,666

6 Claims. (Cl. 260—671)

The present invention concerns an improved process for continuously reacting an alkylating agent with an aromatic compound in the presence of a Friedel-Crafts catalyst. More particularly, this invention is concerned with automatic control of catalyst activity whereby a continuous correlation is maintained between the activity of the complex catalyst and the rate of addition of fortifying elements.

The reaction of alkylating agents such as olefins and alkyl halides with aromatic compounds in the presence of a metal halide is well known and has been widely applied on an industrial scale. It is well understood that in this reaction the active catalytic agent is not the solid metal halide itself but is a complex organo-metal halide substance comprising the metal halide and aromatic compound and probably also comprising alkylated aromatic compound and hydrohalic acid. This substance which is commonly termed "complex catalyst" or more frequently "catalyst complex," resembles a heavy oil in consistency, is usually brown to black in color, and has a somewhat variable composition depending upon the reactants in the system. In the usual continuous operation, the aromatic and olefin are reacted in the presence of aluminum chloride to yield the catalyst complex and an alkylated liquor. Frequently, so-called "promoters" are also used in this reaction. These are substances such as ethyl chloride and hydrochloric acid which are added in small amounts to benzene or ethylene, or even added to the reaction liquor, for the purpose of accelerating the reaction. By reason of its high gravity, catalyst complex is readily separated from the alkylate by flowing the reaction mixture into a separator which is usually a chamber of relatively large volume provided with separate draw-off lines for the lighter alkylated liquor and the heavier catalyst complex. The catalyst complex then returned to the reactor for re-use.

With continued use, the catalyst complex gradually loses its activity and it is common practice in the art to "fortify" it with fresh aluminum chloride and/or additional promoter to revive its catalytic properties. While the existence of the problem of controlling catalyst activity has been generally recognized, there has not been found a simple, accurate, and sensitive means for continuously determining catalyst activity in order to maintain it constantly at the high level required in a process operating at all times at maximum efficiency. Many methods have been suggested but most of these are long and tedious analytical procedures. The known methods provide only spotty control since there is a significant time lag between the periodic withdrawals of samples from the separator and the ultimate determination of their activity based on their compositional analysis.

It has now been discovered that a correlation exists between the electroconductivity of the catalyst complex and its ability to catalyze the alkylation reaction. Accurate continuous measurement of the electroconductivity of the catalyst complex layer provides a satisfactory means for continuously determining its activity and consequently for indicating the need for fortification of the complex. The following table shows the observed values of the electroconductivities of a number of samples of catalyst complex. Tabulated opposite each value is the percentage of ethylbenzene in an alkylate produced with the catalyst complex by dealkylation of polyethylbenzene. It is well known that the ability of catalyst complex to convert polyethylbenzenes to ethylbenzene in the presence of benzene is a direct indication of its activity—a highly active catalyst complex produces a reaction liquor containing a higher percentage of ethylbenzene than does one which is less active. These data were obtained in an exhaustive series of successive laboratory-scale dealkylations begun with a catalyst of high activity and designed to lower the activity of the catalyst complex as it was used repeatedly without any fortification treatment.

*Electroconductivity of catalyst complex*

| Dealkylation Number | Observed Conductivity, mho$\times 10^3$ | Percent Ethylbenzene In Alkylate |
|---|---|---|
| 1 | 19.5 | 40.5 |
| 4 | 18.7 | 39.2 |
| 10 | 17.2 | 37.3 |
| 12 | 16.3 | 35.7 |
| 19 | 14.6 | 35.5 |
| 26 | 13.5 | 33.9 |
| 33 | 12.0 | 32.7 |

These data indicate that a definite relationship exists between the electroconductivity of catalyst complex and its activity or ability to promote the alkylation reaction.

The principal object of this invention, therefore, is to provide a simple, sensitive, automatic, and inexpensive method of controlling the alkylation process wherein an aromatic hydrocarbon is reacted with an alkylating agent in the presence of a metal halide.

Another object of the invention is to obtain a continuous and accurate determination of the activity of the catalyst complex in an alkylation process.

Still another object is to control conditions in an alkylation process to produce a constant high yield of the desired alkylate.

Further objects and advantages of the invention will appear from the following description of a preferred form of embodiment taken in connection with the attached drawing illustrative thereof. While the process is described with reference to the production of ethylbenzene from the reaction of ethylene with benzene in the presence of an aluminum chloride catalyst complex, this is for purpose of illustration only and it is to be understood that the method is generally applicable to Friedel-Crafts alkylations.

The drawing is a simplified diagrammatic flowsheet of the improved alkylation process of the invention. Ethylene is supplied by pipe 1 to the alkylator 2 while the liquid feed to the alkylator consisting of dry benzene, a small amount of ethyl chloride, and recycle catalyst complex enters at the bottom through line 3. The reaction mixture, after passing through a series of coolers (not shown), flows through line 4 to the separator 5 where the alkylate formed in the alkylators is separated from the catalyst complex. A small side stream of the reaction mixture flows through line 6 to the $AlCl_3$ mixer 7 where it dissolves $AlCl_3$ and overflows through line 8 into the catalyst complex stream 9 from the bottom of the separator. From the separator, the alkylate overflows into the line 10 and is carried by gravity to the suction side of the pump 11 from whence it is pumped to the washing and distillation train for recovery of ethylbenzene.

The catalyts complex layer flows under a baffle at the exist end of the separator, into a surge chamber and out a nozzle near the bottom where it is joined by the fortified reaction mixture stream 8 from the AlCl₃ mixer mentioned above. The combined streams flow to the suction of the pump 12 for recycle to the alkylators via line 13.

A side stream 14 is continuously withdrawn from the recycle stream 13 and passes through the electroconductivity unit 15 where its electroconductivity is measured and overflows back into the separator through outlet 16. A signal is generated in the unit 15 corresponding to the value of the electroconductivity of the catalyst complex stream. This signal is transmitted through line 17 to a four-point indicating conductivity ratio recorder 18 to provide a direct scale reading indicative of the activity of the catalyst complex. When the reading falls below a predetermined value established by calibration with fresh, highly active catalyst complex, the volume of the slip stream of reaction mixture which circulates through the AlCl₃ mixers is increased to provide for the additional amount of AlCl₃ required to fortify the catalyst and restore it to maximum activity. This regulation may be manual or it may be made automatically. If control is to be automatic, when the reading on the recorder falls below a predetermined value, a suitable signal is transmitted through line 19 to controller 20. A control signal is generated therein, which may be electric, pneumatic, hydraulic, or of any other recognized medium, which is transmitted through line 21 to a flow-control valve assembly 22 to permit more of the reaction mixture to pass through line 6 to the AlCl₃ mixer, thus carrying more AlCl₃ into the catalyst complex stream until a sufficient amount is added to raise its activity to the standard level once more.

Instruments designated in the system by numerals 15, 18 and 20 are standard and well known to those skilled in the art. The electroconductivity unit 15, for example, may comprise a standard four-leg Wheatstone bridge arrangement including a reference cell and a measuring cell, several adjustable or fixed resistors and capacitors, and a galvanometer. The reference cell is a sealed glass chamber of appropriate size containing potassium chloride into which are inserted two platinum electrodes. The standard or reference cell provides for temperature compensation, since electrodconductivity varies with temperature. Potassium chloride is used because its temperature coefficient is approximately the same as that of catalyst complex. The measuring cell is the same as the reference cell except that the glass tube case is open at the bottom with a perforated wall. Controller 20, operatively connected to 18 through line 19, may include a solenoid operated valve capable of admitting air through line 23 to line 21. Flow-control valve assembly 22 could suitably be an air operated slide valve.

As mentioned previously, the invention has been described, for the purpose of clarity, with special reference to the preparation of ethylbenzene but it may be applied in producing other alkylated aromatic compounds. For instance, the method may be employed in reacting ethylene with toluene to produce ethyltoluenes; in reacting propylene with benzene to produce isopropyl benzene or a polyisopropylbenzene; in reacting butylene with benzene to form a butylbenzene or polybutylbenzene, and the like.

The process of the invention is also applicable in dealkylation processes. It is well known that polyalkylaromatic compounds such as polyethylbenzene may be reacted with an aromatic compound such as benzene in the presence of a Friedel-Crafts organo-metal halide catalyst complex to yield the monoalkylated compound such as ethylbenzene. The same problems of maintaining catalyst activity are presented in such dealkylation processes and the process of the invention may be utilized as successfully for maintaining maximum catalyst complex activity in these processes as it is in the alkylation process described.

The process of the invention is applicable as well in combined alkylation-dealkylation processes and in processes where, instead of carrying out the dealkylation reaction separately, the polyalkylated aromatic compound is returned to the alkylation reaction where it serves to suppress the further formation of polyalkylated material and to direct the reaction to the formation of the monoalkylated product. The procedures for carrying out such reaction are well known and need not be given in detail.

What is claimed is:

1. In a process for the preparation of monoalkylated aromatic compounds wherein an olefin is reacted with an aromatic compound in the presence of a Friedel-Crafts organo-metal halide catalyst complex and a promoter to produce both mono- and polyalkylated aromatic compounds and wherein said polyalkylated aromatic compounds are dealkylated in the presence of said catalyst complex, said catalyst complex being fortified at intervals by the addition of fresh metal halide, the steps which comprise passing a portion of said catalyst complex through an electroconductivity measuring device, measuring the electroconductivity of the catalyst complex, and regulating the addition of the metal halide to said catalyst complex with respect to a predetermined electroconductivity setting by supplying a sufficient amount of metal halide to said catalyst complex whenever said electroconductivity measurement falls below said predetermined electroconductivity setting to restore the electroconductivity of said complex to said predetermined electroconductivity setting.

2. In a process for the preparation of alklated aromatic compounds wherein an olefin is reacted with an aromatic compound in the presence of a Friedel-Crafts organometal halide catalyst complex and a promoter and wherein said catalyst is fortified at intervals by the addition of fresh metal halide, the steps which comprise passing a portion of said catalyst complex through an electroconductivity measuring device, measuring the electroconductivity of the catalyst complex, and regulating the addition of the metal halide to said catalyst complex with respect to a predetermined initial electroconductivity setting by supplying a sufficient amount of metal halide to said catalyst complex whenever said electroconductivity measurement falls below said predetermined electroconductivity setting to restore the electroconductivity of said complex to said predetermined electroconductivity setting.

3. In a process for the preparation of monoalkylated aromatic compounds wherein polyalkylated aromatic compounds are dealkylated in the presence of a Friedel-Crafts organometal halide catalyst complex and a promoter said catalyst complex being fortified at intervals by the addition of fresh metal halide, the steps which comprise passing a portion of said catalyst complex through an electroconductivity measuring device, measuring the electroconductivity of the catalyst complex, and regulating the addition of the metal halide to said catalyst complex with respect to a predetermined electroconductivity setting by supplying a sufficient amount of metal halide to said catalyst complex whenever said electroconductivity measurement falls below said predetermined electroconductivity setting to restore the electroconductivity of said complex to said predetermined electroconductivity setting.

4. The process of claim 1 in which said olefin is ethylene, said aromatic compound is benzene, said organometal halide catalyst complex is a complex of aluminum chloride said promoter is hydrogen chloride, and said polyalkylated aromatic compounds are polyethylbenzenes.

5. The process of claim 2 in which said aromatic compound is benzene, said olefin is ethylene, said organometal halide catalyst complex is a complex of aluminum chloride said promoter is hydrogen chloride, and said metal halide is aluminum chloride.

6. The process of claim 3 in which said polyalkylated aromatic compounds are polyethylbenzenes, said organometal halide catalyst complex is a complex of aluminum chloride said promoter is hydrogen chloride and said metal halide is aluminum chloride.

References Cited in the file of this patent

UNITED STATES PATENTS

| | | |
|---|---|---|
| 1,399,181 | Bascom | Dec. 6, 1921 |
| 1,399,200 | Edelman | Dec. 6, 1921 |
| 2,211,704 | Robinson | Aug. 13, 1940 |
| 2,498,567 | Morris | Feb. 21, 1950 |
| 2,765,218 | Amir | Oct. 2, 1956 |

OTHER REFERENCES

Chem. Abs., vol. 3, page 1147 (1909).

Thomas: Anhydrous Aluminum Chloride in Organic Chemistry, Reinhold Publishing Corp., 330 W. 42nd St., New York, N. Y. (1941), pages 98, 100, 103 and 104.

Shreve: Industrial and Engineering Chemistry, vol. 45, No. 9, September 1953, pp. 1903–1912 (p. 1903 only relied on).

Shreve: Industrial and Engineering Chemistry, vol. 47, No. 9, September 1955, pp. 1826–1839 (p. 1829 only relied on).